United States Patent [19]

Tomforde et al.

[11] Patent Number: 6,070,320
[45] Date of Patent: *Jun. 6, 2000

[54] COST EFFECTIVE AND LOGICALLY OPTIMIZED ASSEMBLY PLANT FOR SERIES PRODUCTION OF INDUSTRIAL PRODUCTS, ESPECIALLY VEHICLES

[75] Inventors: Johann Tomforde, Sindelfingen; Wilfried Gross, Renningen; Juergen Riehl, Stuttgart, all of Germany

[73] Assignee: Micro Compact Car AG, Biel, Switzerland

[ * ] Notice: This patent issued on a continued prosecution application filed under 37 CFR 1.53(d), and is subject to the twenty year patent term provisions of 35 U.S.C. 154(a)(2).

[21] Appl. No.: 08/635,510

[22] Filed: Apr. 22, 1996

[30] Foreign Application Priority Data

Apr. 20, 1995 [DE] Germany ............... 195 14 594

[51] Int. Cl.$^7$ ................................. B23P 21/00
[52] U.S. Cl. ................ 29/771; 29/783; 29/791; 29/822; 52/31; 52/236.1; 52/79.4; 198/860.3
[58] Field of Search ................ 29/430, 771, 783, 29/791, 822, 823, 824; 198/860.3, 860.4; 52/DIG. 14, 31, 33, 79.4, 236.1

[56] References Cited

U.S. PATENT DOCUMENTS

| | | | |
|---|---|---|---|
| 508,455 | 11/1893 | Wells | 52/236.1 |
| 700,794 | 5/1902 | Cooke | 52/236.1 X |
| 1,408,047 | 2/1922 | Upp | 29/791 |
| 2,154,897 | 4/1939 | Grant | 52/236.1 X |
| 2,156,859 | 5/1939 | Lowe | 52/236.1 X |
| 2,872,709 | 2/1959 | Brem | 52/33 X |
| 4,524,864 | 6/1985 | Peterson, II | 52/31 X |

FOREIGN PATENT DOCUMENTS

| | | | |
|---|---|---|---|
| 0071089 | 2/1983 | European Pat. Off. | 52/236.1 |
| 0 430 739 | 6/1991 | European Pat. Off. . | |
| 596 820 | 5/1994 | European Pat. Off. | 198/860.3 |
| 61-21869 | 1/1986 | Japan . | |
| 61-119481 | 6/1986 | Japan . | |
| 62-101588 | 5/1987 | Japan . | |
| 1 412 458 | 11/1975 | United Kingdom . | |

*Primary Examiner*—Joseph M. Gorski
*Attorney, Agent, or Firm*—Evenson, McKeown, Edwards & Lenahan, PLLC

[57] ABSTRACT

An assembly plant for the series assembly of vehicles has a main assembly line and associated assembly works for relatively complex vehicle parts to be supplied "just in time". Simpler assembly components and small and standard components are held in readiness in a central component store and supplied from there to the assembly line. Stores for large components are arranged near to the corresponding assembly point. The overall conveying section is divided into a plurality of mutually adjoining U-shaped conveying loops. Provided between each of the assembly shops and the central component store, on the one hand, and the main assembly line, on the other, there are in each case feeder systems. In order to optimize the assembly plant both logistically and in terms of operation and costs, individual U-shaped conveying loops of the assembly line are directed radially away from a center of the assembly plant, preferably orthogonally relative to one another, leaving a free space between adjacent U-shaped conveying loops. In this arrangement, the separate assembly shops and the central component store are accommodated in immediate proximity to the assembly line in the free spaces between the conveying loops. The conveying loops can be arranged in the form of a cross or a T or L shape and, in part, also parallel to one another and directly adjacent to one another.

13 Claims, 5 Drawing Sheets

COST EFFECTIVE AND LOGICALLY OPTIMIZED ASSEMBLY PLANT FOR SERIES PRODUCTION OF INDUSTRIAL PRODUCTS, ESPECIALLY VEHICLES

BACKGROUND AND SUMMARY OF THE INVENTION

The invention relates to an assembly plant for the series assembly of industrial products, especially vehicles. The assembly plant is of the type in general use at the present time in industrial manufacture, for example also in the construction of motor vehicles.

In these known assembly plants, the assembly line runs in a plurality of U-shaped loops, all of which run parallel to one another and are situated directly adjacent to one another. This conventional layout of an assembly plant offers the advantage of low expenditure on conveying technology for the return of the assembly skids from the end of the line to the beginning of the line. Because of the compact arrangement of the individual sections of the assembly line, good communication between these sections is also possible. A favorable ratio between facade length and required surface area is furthermore advantageous. Moreover, the small components, which can be delivered to the assembly line by the crate load in batches containing a large number of items, can be delivered to the assembly points via the access lanes between the sections of the assembly lines. However, logistically linking the more complex parts which are to be supplied "just in time" is difficult. Given a compact layout of this kind, the conveying systems required for this purpose are very expensive because a floor-supported conveying system for such large components is no longer possible. The only possibility is to use expensive large component overhead conveyors, which are costly to install and furthermore less flexible for subsequent changes of target location.

It is the object of the invention to optimize the generic assembly plant both logistically and in terms of operation and costs.

Taking the assembly plant of the generic type as a basis, this object is achieved, according to the invention, by an assembly plant for the series assembly of industrial products, especially vehicles, with an assembly line accommodated in a main assembly shop and with a plurality of associated assembly works for vehicle parts to be supplied. The assembly plant includes a linear—floor-supported or overhead—conveying device for slowly moving forward a series of product carriers—referred to below as "skids" for short—by means of which conveying device the main assembly line is formed. The plant also includes a plurality of pairs, each comprising two equal part-lengths of the conveying device, which are arranged parallel and adjacent to one another, i.e. in a U-shape with opposing conveying directions. Thus, the overall conveying line is divided into a plurality of mutually adjoining conveying loops. The plant further includes a plurality of separate assembly shops for relatively large and relatively complex product parts which are to be preassembled at separate locations and supplied to the assembly line "just in time". Further, a central component store for assembly components requiring little or no preassembly and taking up little space for each individual component is provided, as well as a plurality of stores for large components, arranged noncentrally in, at or next to the main assembly shop near to the assembly point. The plant feeder systems between each of the separate assembly shops and the non-central stores, on the one hand, and the assembly line, on the other, are provided for the purpose of linking the assembly shops or stores logistically to the respective workstations along the assembly line at which the relevant product part or a large component is required. U-shaped conveying loops of the assembly line are directed radially away from a center of the assembly plant and arranged so as to leave a free space between adjacent U-shaped conveying loops. At least some of the separate assembly shops and the central component store are accommodated in the free spaces between the conveying loops in immediate proximity to the main assembly shop of the assembly line.

Owing to the spread-out and preferably cross-shaped arrangement of the conveying loops of the assembly line, it is possible to accommodate in the free spaces created between the assembly lines supplier works for components to be installed. This gives short access paths from the supplier works to the main assembly line. The communication paths within the main assembly line are nevertheless very short and it is not necessary to install separate conveying devices for the return of the empty skids. Relatively complex large components can be supplied along the floor transversely to a section of the assembly line, this merely presupposing simple, floor-supported and functionally flexible conveying systems. The target location for the delivery of components of this kind can be changed as required without any great expenditure on conversion.

The advantages of the configuration of the assembly plant in accordance with the invention lie in the fact that all the following points can be provided in combination, whereas known alternative solutions only manage to provide some of the following advantageous points: 1) short communication paths within the main assembly line; 2) short feed paths for the small and standard components and medium-sized components to the various scattered assembly points from the centrally situated ends of the conveying loops or from lateral parking places for interchangeable bodies of lorries; 3) in the event of an increase in the capacity of the assembly plant, i.e. an increase in the yearly production, the assembly line can be expanded without too much trouble, without disrupting the separate assembly shops for the product components and without interrupting production on the main assembly line, by extending the free ends of the conveying loops; 4) low expenditure on conveying technology and low space requirement for the return of the empty skids or overhead conveyors from the end of the assembly line to its start; 5) short logistical links between the separate assembly shops and the respectively desired assembly point of the main assembly line; 6) short communication paths between the main assembly line, on the one hand, and the separate assembly shops, on the other; 7) flexible accommodation of the separate assembly shops between the respective conveying loops of the main assembly line, i.e. where there is an increase in the capacity of the main assembly line the separate assembly shops for the product components can also be expanded or enlarged; and 8) good ratio between site area or built-on area and the perimeter length of the assembly plant.

Other objects, advantages and novel features of the present invention will become apparent from the following detailed description of the invention when considered in conjunction with the accompanying drawings.

DETAILED DESCRIPTION OF THE DRAWINGS

Figure 1:
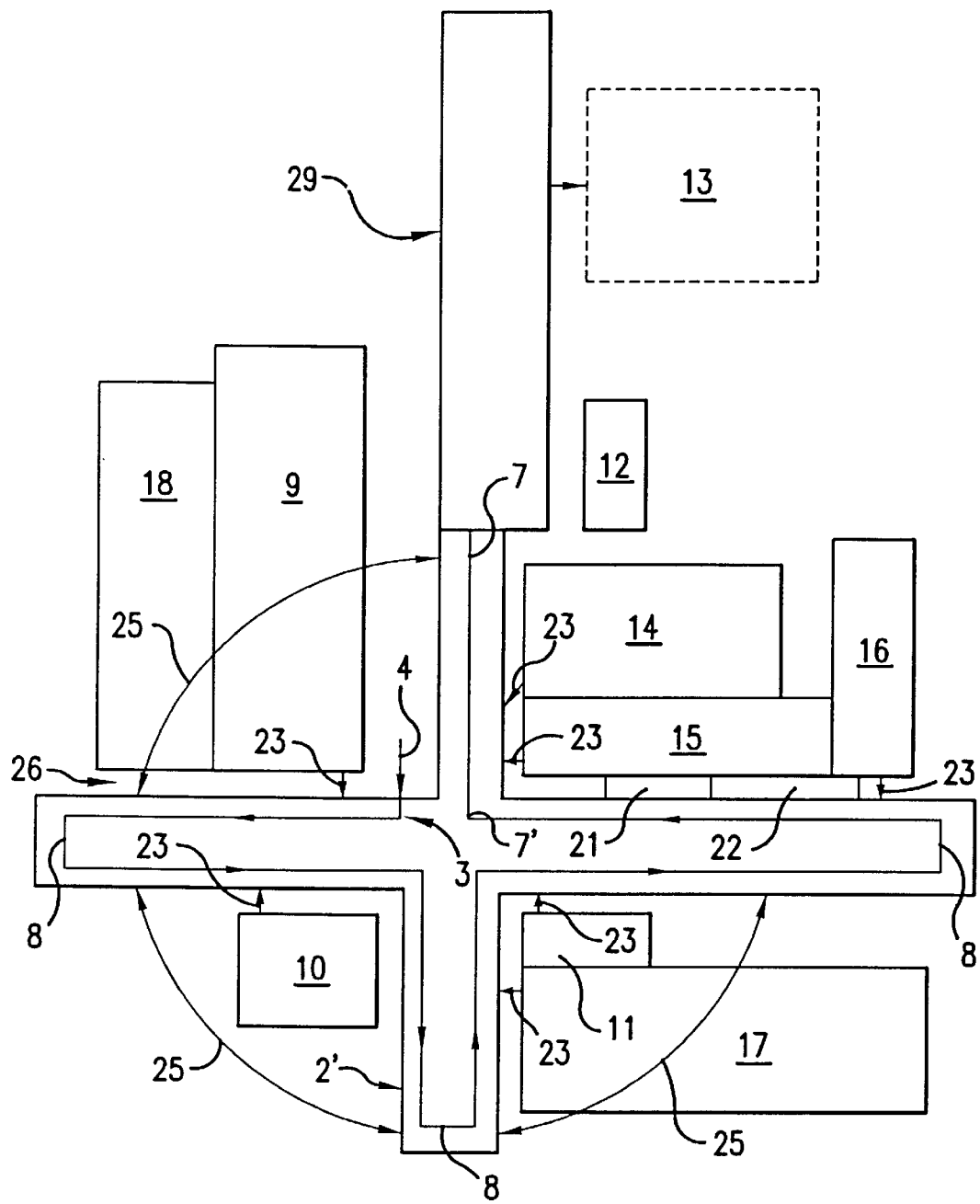
FIG. 1 is a schematic block diagram of a first embodiment of a layout of an assembly plant with the U-shaped loops of the assembly line arranged in a cross shape.

The invention relates to an assembly plant for the series assembly of vehicles 1. Accommodated in a main assembly shop 2, 2', 2" is a main assembly line 3. A plurality of associated assembly works for vehicle components to be supplied are arranged in the immediate vicinity of the main assembly shop. A linear conveying device 5 (FIG. 5), which forms the main assembly line 3, moves slowly forward a series of vehicle skids 6 (FIGS. 4 and 5)—forming a floor-supported conveying device—or overhead conveyors. A plurality of pairs each comprising two equal part-lengths of the conveying device are arranged parallel and adjacent to one another, i.e. in a U shape with opposing conveying directions, and the overall conveying line is thus divided into a plurality of mutually adjoining U-shaped conveying loops 8.

At the starting point 4 of the assembly line 3, a frame or chassis is placed on the skid situated there and, at the end point 7' of the conveying device/assembly line, the almost fully assembled vehicle is driven away from the skid situated there. The vehicles can be moved through the remainder of the assembly line on their own wheels, e.g. by means of a drag conveyor. A return conveying device transports the empty skids 6 back from the end point 7' to the starting point 4 of the assembly line 3.

Relatively large and complex vehicle parts to be supplied "just in time" to the assembly line 3, for example the cockpit, seats, front axle, drive assembly, rear axle, doors, tailgate, roof, integral supports, etc., are preassembled at separate locations in a plurality of separate assembly shops. Assembly components requiring very little or no preassembly and/or taking up little space for each individual component, e.g. small and standard components and medium-sized components such as bodywork components, windscreen or the like, are held in readiness in a central component store, e.g. in the store 18 for small and standard components, and supplied from there to the assembly line 3 as and when required.

Arranged noncentrally in the main assembly shop 2, 2', 2" there is furthermore a plurality of stores 21 or 22 for large components such as wheels, bumpers or the like, in each case being located near to the corresponding assembly point. Provided between each of the separate assembly shops and the central component store 18, on the one hand, and the main assembly line 3, on the other, there are in each case feeder systems 23, in order to be able in each case to logistically link the workstations along the assembly line 3 at which the relevant vehicle part or an individual component is required to the respective noncentral component stores.

In order to optimize the assembly plant logistically and in terms of operation and costs, individual U-shaped conveying loops 8 of the assembly line 3 are directed radially away from a center of the assembly plant and arranged so as to leave a free space 25, 25' which radially opens in a funnel-like manner between adjacent U-shaped conveying loops 8. The separate assembly shops, the central component store 18 and non-central stores 21 or 22 are accommodated in the free spaces 25, 25' between the conveying loops 8, in immediate proximity to the main assembly shop 2 of the assembly line 3.

Figure 4:
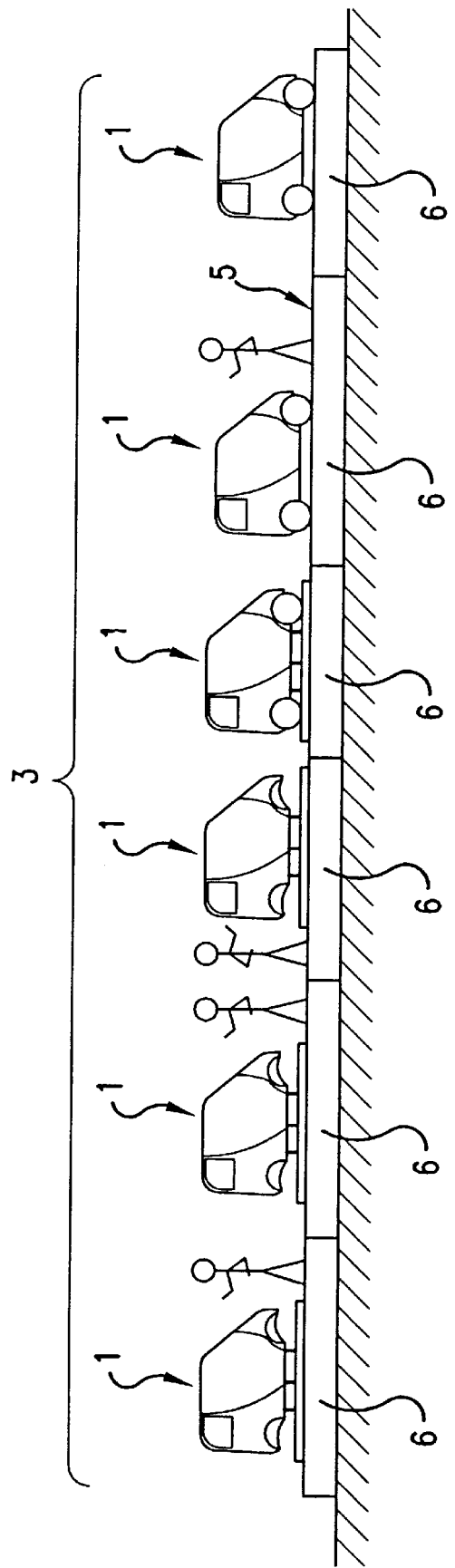
FIG. 4 shows an enlarged side view of a section of the assembly line.
Figure 5:
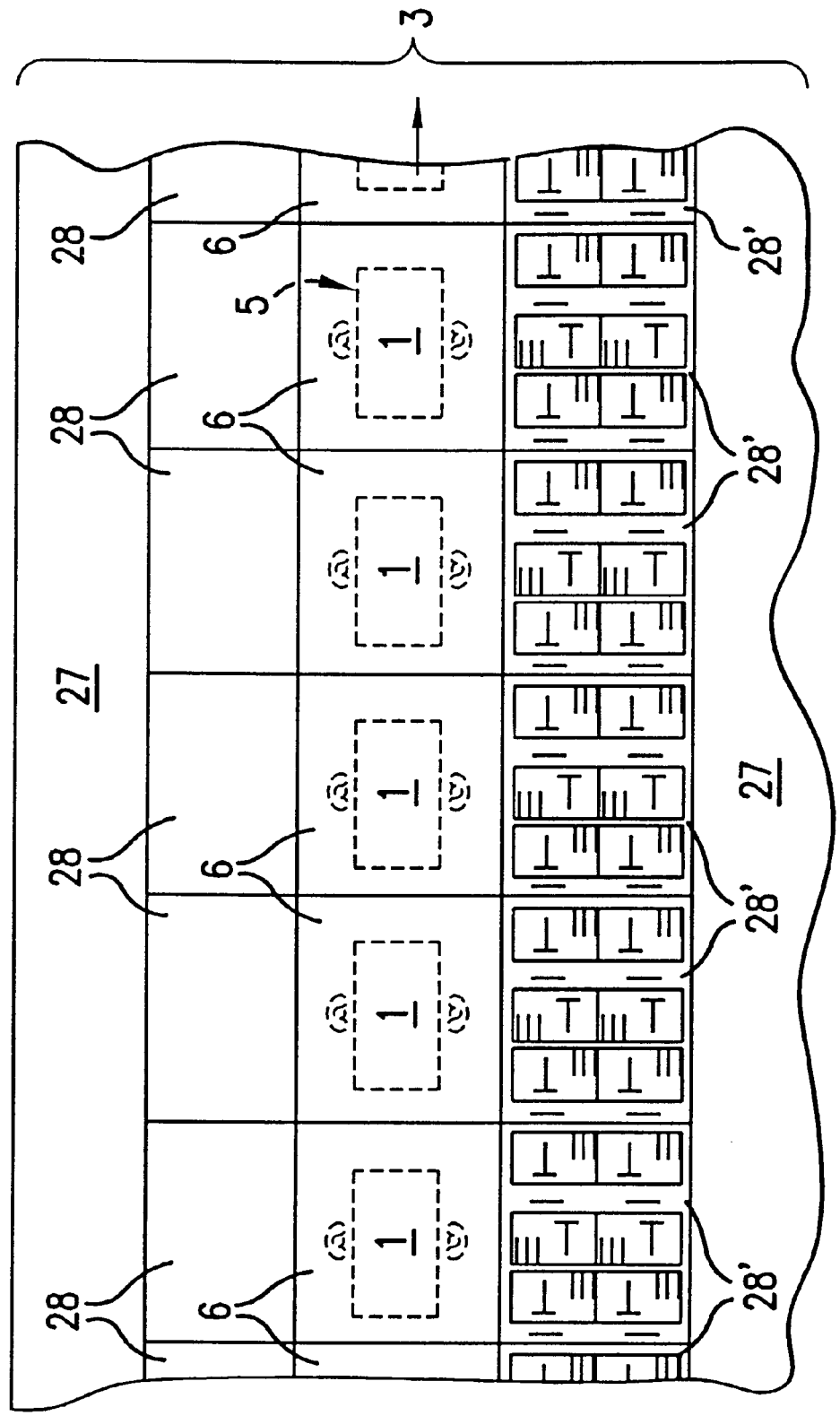
FIG. 5 shows an enlarged plan view of a section of the assembly line.

FIGS. 4 and 5 show one possible design of the assembly line. The vehicles 1 which are being assembled are placed on a moving product carrier, what is referred to as a skid 6, which forms an access platform for the worker. The skids are moved forward in a linear manner as a unitary assembly through a channel formed between pedestals of equal height by means of a floor-supported conveying device 5 or by means of overhead conveying technology, it being possible for the skids to form part of a pushed assembly or a drag system or to be self-driven. Together, they form at least part of the assembly line 3. In the region of corners or reversal points, the skids are turned around—either under their own power or by separate turn-around conveyors. In this manner, it is possible to form an assembly line with any desired convolution. Material deposition surfaces 28 and 28' for components to be installed are created on the pedestals arranged on both sides of the conveying channel, it being possible, for example, for small components to be placed ready on one side and more bulky components in relatively large transport containers to be placed ready on the other side.

Access lanes 27 are provided on both sides of the assembly line in the assembly shop for fork-lift trucks or similar industrial trucks.

In the example of the layout illustrated in FIG. 1, three conveying loops 8 are arranged orthogonally relative to one another in the form of a cross, with the result that the associated main assembly shop 2 also has a cross-shaped ground plan. Three individual conveying loops 8, each with a 90-degree free space between them, are formed, radially extending away from a center. Assembly begins at the inside of the first conveying loop, illustrated on the left in the figure, at point 4, with the delivery of what is referred to as the "space frame" of the vehicle. In the exemplary embodiments shown, the space frame is produced at a separate, remote manufacturing location and periodically delivered at the appropriate time. It is quite conceivable that it could likewise be produced on the site occupied by the final assembly plant in an adjacent shop directly linked up in terms of logistics, but this is not envisaged here.

It is assumed for the further description of the assembly plant layout that the illustrations are cartographically correct, i.e. that the top edge of the figure faces north. Thus, a separate assembly shop 9 for the cockpit is then arranged to the north of the first 5 conveying loop, i.e., the western conveying loop, and the central store 18 for small and standard components is then arranged next to and to the west of the latter. The cockpit is assembled at a very early stage, for which reason the cockpit assembly shop 9 has been arranged next to this first section of the assembly line 3. It is arranged next to the main assembly shop 2 with a free space 26 sufficient for an access road. If necessary and this, of course, also applies to the other, separate i assembly shops mentioned below—this free space can be used to accommodate an access road or to accommodate a perimeter fence, a works security installation or the like, or landscaping. Account should namely be taken of the fact that the separate assembly shops are generally under different management and belong to different companies and even, in some circumstances, to different sectors. Depending on legal provisions, which may vary from one country to another, the different shops may be brought together spatially under a single roof or will have to be spatially separated. The gap 26 mentioned between the separate assembly shop and the main assembly shop is bridged logistically by a feeder system 23. The feeder system is arranged underground or above ground, leaving at least 3 m clearance approximately for vehicles to be driven through.

Because of the large number of components which are stored in the central store 18 for small and standard components and are ordered as required for the individual workstations, selectively located logistical links between the central store 18 and the assembly line 3 are not possible. Instead, the components are here transported to the workstations by the crate load and in amounts sufficient for no more than one shift, using controlled vehicles. It is moreover also possible for components that are to be supplied from outside to be made ready as required by setting up interchange bridge structures for commercial vehicles at corresponding ramps or delivery points arranged near to the assembly locations and for them to be docked with the shop.

The assembly shop 10 for the seats is located on the south side of the western delivery loop 8 and is logistically linked at a local point, using a feeder system 23 which bridges the free space 26, to the assembly line or the assembly stations at which the seats are assembled. After the southern section of the western conveying loop has again returned to the central point of the main assembly shop 2, the assembly line turns south into a southern conveying loop. Arranged next to the eastern section of the southern conveying loop of the assembly line is a large assembly shop 17 for what is referred to as an integral support. This technically complex module comprises the complete rear axle and the drive-assembly block integrated into the latter. At the beginning of a new conveying loop, the eastern conveying loop, the considerably smaller assembly shop 11 for the front axle is arranged on the south side of the latter.

Conditions are more cramped in the north-eastern quadrant between the eastern conveying loop and the single, northward section of the assembly line. Three separate assembly shops and two non-central stores for large components are arranged there, these comprising: 1) the assembly shop 16 for the different roof variants, which is linked on the north side of the eastern conveying loop to the main assembly line; 2) the assembly shop 15 for the tailgate and the assembly shop 14 for doors, both of which are coupled to the northern section of the assembly line; and furthermore 3) a store 21 for wheels and a further store 22 for bumpers, which are arranged close to the assembly point on the north side of the eastern conveying loop.

The assembly line 3 ends at point 7 at the end of the northern section of the assembly line. However, the conveyance of the vehicles via the skids 6 comes to an end before this point, namely at the inner end of the northern section of the western loop—point 7'. There, the finished vehicles are taken from the skids 6; from then on, they roll on their own wheels, being moved via a drag or steel-plate conveyor, through the northward-extending section of the assembly line. At the end of the latter, the finished vehicles are driven into the run-in department 29 and final finishing section, from where the finished vehicles finally reach the vehicle dispatch area 13. The empty skids 6 or, in the case of overhead conveyor technology, the empty overhead conveying equipment, are conveyed back from point 7' to the beginning of the assembly line 3 at point 4, for which purpose, in the case of passive skids, a corresponding conveying device must be provided. In the case of automatically steered, self-propelled active skids, these skids can drive back themselves on a protected access lane.

One significant building that forms part of the infrastructure—the liquid store 12—can be located at a more remote location because of the ease with which the various substances such as oils, fuels, brake fluids, washing liquids or the like can be supplied via pipes.

From the layout illustrated in FIG. 1, it can be seen that the assembly plant and/or the integrated supplier operations can be readily expanded if required. A requirement for such expansion may arise, for example, by an increase in capacity, leading as a rule to an increase in the number of assembly points and thus to an increase in the length of the assembly line. The cross-shaped main assembly shop 2 can be increased in length at one or more of the three ends of the conveying loops, and expansion of capacity can thus be performed in stages. On the western side of the northern section of the assembly line, too, there remains space for expansion; the beginning 4 of the assembly line can be shifted into immediate proximity to the end 7 and the assembly line thus increased in length. The supplier operations can likewise p be expanded, at least in one direction and frequently in two directions. The location of the logistical linking between the separate assembly shops can be changed without any great disruption to the main assembly shop. If necessary, the feeder systems can run for a certain distance parallel to the outside of the main assembly shop.

Figure 2:
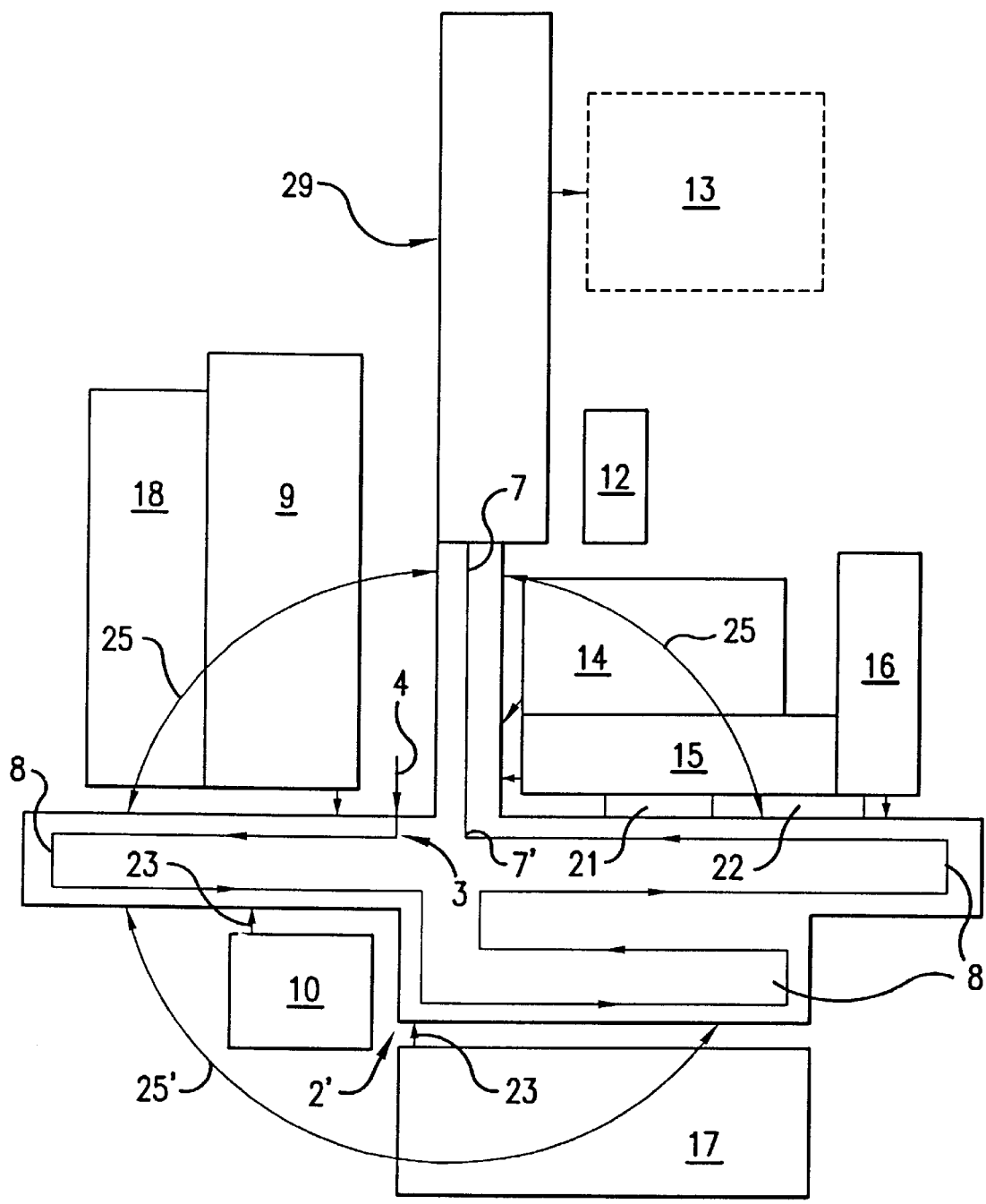
FIG. 2 is a schematic block diagram of a second embodiment of a layout with the loops arranged in a T shape, one pair of loops being arranged parallel and adjacent to one another.

The layout shown in FIG. 2 differs from that shown in FIG. 1 in that the U-shaped conveying loops 8 are arranged essentially in a T shape, two conveying loops being arranged parallel to one another and directly next to one another on the south side, i.e. without a free space in between. The location of the assembly shop for the front axle is not shown separately here; it can, for example, be incorporated into the shop 17 for the integral support. The logistical link 23 is here made from the inside of the more southerly conveying loop. In other respects, the layout corresponds to that in FIG. 1.

Figure 3:
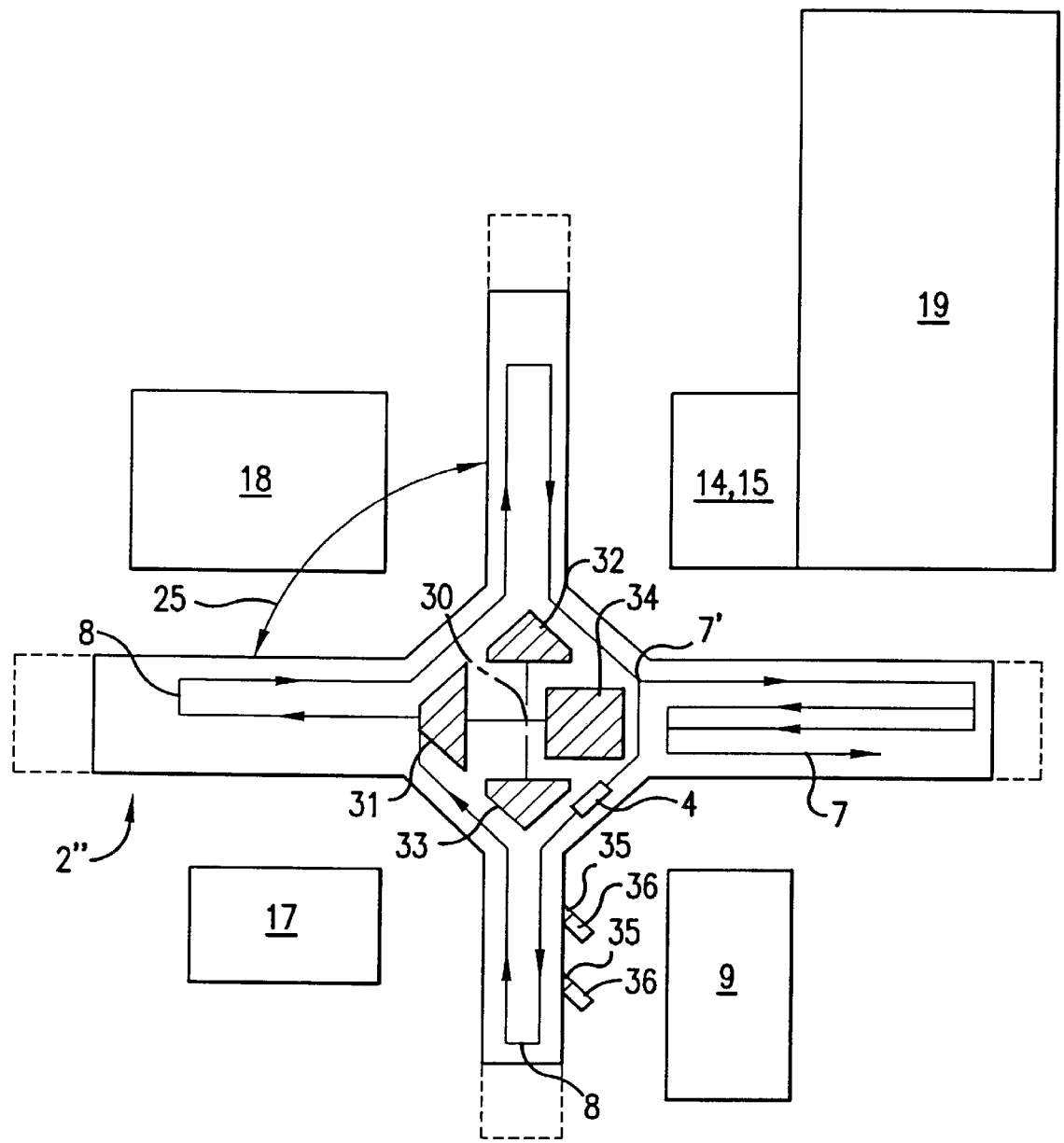
FIG. 3 is a schematic block diagram of a third embodiment of a layout with the loops arranged in a cross shape, sections of the assembly line here being positioned tangentially and at a distance from the center in the central area of the cross in order to make space in the central area for central functions.

In the third example of a layout in accordance with FIG. 3, the loops 8 are likewise arranged in a cross shape although here the sections of the assembly line which are within the central area of the cross are laid-out tangentially, i.e. approximately at right angles, to the angle bisector in the free spaces 25 and at a distance from the center 30 in order to create space in the central area for central functions. Examples which may be mentioned in this context are offices 31 for foremen and management and administrative staff, training rooms 32, material presentation rooms 33 and a quality and refinishing center. This example also shows, in the southern wing, docking points 35, which are located close to assembly points for components delivered by more remote suppliers. Depending on the space conditions outside the assembly shop for the associated lorries to maneuver, the docking points 35 can be arranged at right angles or—preferably and as shown in FIG. 3—at an acute angle to the outer wall of the assembly shop. At these docking points, interchangeable containers or interchangeable bodies 36 for lorries can be docked in a weatherproof manner, allowing the components delivered in the interchangeable bodies to be removed as required as if from an internal store.

In the east wing of the assembly shop 2", sections of the assembly line are provided in which the vehicles roll on their own wheels and are moved forwards by a drag conveyor. A total of four sections are passed through here along a meandering path. Arranged on the north side, there is first of all an assembly line for the tailgate, doors and external bodywork components, which latter are produced, ready for installation, in shop 19. In the three lines arranged to the south thereof, various checks and adjustment operations such as engine operation and performance testing, adjustment of the track and camber and the like are carried out. The southernmost section is the finishing band, in which the fully assembled vehicles are made ready for dispatch, i.e. fingerprints or the like are removed from the paintwork by polishing, the interior of the vehicle is cleaned, the official paperwork for the vehicle is checked and placed in the vehicle, to mention but a few. From there, the vehicles are driven under their own power to the vehicle dispatch area after driving through a rattle detection section.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An assembly plant, comprising:
   a central portion;
   a conveying device having a travel path defined by at least three interconnected substantially U-shaped conveying loops, with each of the U-shaped conveying loops including:
   (i) a conveying pair, with each conveying pair comprising two substantially equal part lengths arranged parallel and adjacent to one another, with a first of the lengths traveling from a first end to a second end away from said central portion, and a second of the lengths traveling from a third end to a fourth end toward said central portion; and
   (ii) an intermediate length interconnecting the substantially equal part lengths of each of the conveying pairs, respectively, wherein each of the intermediate lengths travels from the second end to the third end of the equal part lengths of each of the conveying pairs, respectively;
   a main assembly shop housing said conveying device, wherein the main assembly shop has a floor plan that corresponds in shape to said conveying device, whereby the main assembly shop has sections respectively enclosing said U-shaped conveying loops, such that each of said sections extends substantially radially from said central portion with adjacent ones of said sections defining a radially diverging space therebetween;
   a plurality of work stations arranged along said conveying device;
   a plurality of separate assembly shops in which relatively large and relatively complex product parts are assembled, which product parts are to be supplied to first assembly points, respectively, on said conveying device, wherein at least some of the separate assembly shops are located in at least one of the radially diverging spaces in immediate proximity to said main assembly shop, respectively;
   a component store in which components are stored which require minimal or no pre-assembly, wherein the component store is located within one of the radially diverging spaces in immediate proximity to said main assembly shop;
   a plurality of auxiliary stores in which large components are stored, the stores being located one of non-centrally in, at and next to said main assembly shop respectively near second assembly points on said conveying device; and
   a feeder system interconnecting each of said separate assembly shops and each of said auxiliary stores, with one of said work stations, respectively.

2. Assembly plant according to claim 1, wherein said adjacent ones of said sections defining the radially diverging space therebetween are arranged orthogonally relative to one another.

3. Assembly plant according to claim 1, wherein the separate assembly shops are arranged next to the main assembly shop so as to define a further free space dimensioned to accommodate an access road.

4. Assembly plant according to claim 3, further comprising an additional conveying loop arranged parallel and directly adjacent to one of said U-shaped conveying loops as part of the conveying device.

5. Assembly plant according to claim 1, wherein the conveying loops are arranged in one of a cross and a T shape form.

6. Assembly plant according to claim 1, wherein in the central portion of the assembly plant, sections of the conveying device travel tangentially with respect to a closed plane curve about the central portion in order to create a space in the central portion for central functions.

7. Assembly plant according to claim 1, wherein docking points for weatherproof docking of interchangeable bodies for lorries are located in an outer wall of the assembly shop near to third assembly points.

8. Assembly plant according to claim 1, wherein the feeder systems which logistically connect the separate assembly shops to the assembly line of the main assembly shop are arranged at least one of underground and above ground with a clearance of at least approximately 3 m for vehicles to be driven through.

9. Assembly plant according to claim 1, wherein said assembly plant is for assembling vehicles and said plurality of separate assembly shops, auxiliary stores and component store provide vehicle parts.

10. Assembly plant according to claim 1, wherein said conveying device is formed of at least one of a floor supported and overhead conveying device.

11. Assembly plant according to claim 1, wherein said conveying device accommodates product carriers in the form of skids.

12. The assembly plant of claim 1, wherein said second and third ends of each conveying pair, together with said intermediate length, form a free end of each U-shaped conveying loop, and wherein the assembly plant is expandable without disrupting production by extending the free end of the U-shaped conveying loop and any associated separate assembly shop located in an adjacent free space.

13. The assembly plant according to claim 1, wherein the feeder systems comprise floor-supported feeder systems.

* * * * *